UNITED STATES PATENT OFFICE.

FRANK H. LEWIS, OF NEW HAVEN, CONNECTICUT.

PASTE COMPOSITION FOR SAVING GOLD-LEAF.

SPECIFICATION forming part of Letters Patent No. 616,791, dated December 27, 1898.

Application filed September 19, 1898. Serial No. 691,366. (No specimens.)

*To all whom it may concern:*

Be it known that I, FRANK H. LEWIS, of New Haven, in the county of New Haven and State of Connecticut, have invented a new Improvement in Paste or Composition for Saving Gold-Leaf; and I do hereby declare the following to be a full, clear, and exact description of the same.

My invention relates to an improved paste or composition for the use of book-finishers, book-stampers, gold-beaters, edge-gilders, sign-painters, picture-frame and furniture gilders, and any other artisans employing gold-leaf, the object being to provide a simple, cleanly, and effective medium for saving the maximum percentage of waste gold-leaf which would otherwise be lost and which is now saved, so far as it is saved, by the use of a flannel cloth.

With these ends in view my invention consists in a paste or composition for saving gold-leaf having certain qualities and ingredients, as will be hereinafter described, and pointed out in the claim.

In carrying out my invention I preferably take one pound of crude rubber, which has been "chewed" or cut very fine by the employment of any of the mechanical devices commonly used for the purpose. To this pound of finely chewed or cut rubber I add one quart of refined kerosene-oil or any equivalent substance. I let these two ingredients stand approximately twenty-four hours, at the termination of which the oil will be found to have "cut the rubber," so to speak, in the production of a pulp-like mass, which is now drained in any suitable manner, so as to strain off the superfluous oil, if there be any. After this draining operation I add to the mass three ounces of oil of benzoin and let the whole stand approximately twenty-four hours longer. The resulting mass is then turned out on a marble slab and allowed to lie there for about twenty-four hours, (more or less, according to the weather,) after which it is thoroughly kneaded as bread is kneaded, so as to make it uniform in consistence. The mass is then allowed to dry, for which purpose it is turned. These operations above detailed, I should have remarked, are to be carried on in a cool place. After the mass is dried it is divided into portions of the required weight and put up for the market, preferably being wrapped in paraffin-paper and inclosed in tin boxes.

In using the paste or composition a small fragment is torn from the mass and worked into a wad, which is held in the fingers while it is applied to the work being done, so as to remove all superfluous fragments of gold-leaf, as well as any fragments of gold-leaf which may drop onto the table or blow upon the floor. On account of the presence of the oil of benzoin in the paste it is prevented from adhering to the fingers; but at the same time the paste is of such a character that it neither soils the fingers nor the articles with which it may come in contact. The gold-leaf so picked up is kneaded into a wad by working the same with the fingers. Finally, when the wad so used has taken up all of the gold-leaf that it can take up it becomes somewhat sticky, which indicates that it must be laid aside for sending to the smelter, who easily recovers the gold. In this way all flying and waste fragments of gold-leaf are very simply saved with a minimum expenditure of time and with the minimum of loss. The presence in the paste of the oil of benzoin prevents the paste or composition from hardening, even though it may be kept a very long time.

It will be understood, of course, that the proportions stated for the ingredients may vary more or less, according to the quality and character of the ingredients, and that the operation of combining them may be varied more or less from the method described, with which, however, I have secured very excellent results. I would therefore have it understood that I do not limit myself to the exact proportions or method described, and it may be that some equivalent substances may be found for the ingredients mentioned.

Having fully described my invention, what I claim as new, and desire to secure by Letters Patent, is—

A paste or composition for saving gold-leaf, prepared by compounding crude rubber, kerosene-oil and oil of benzoin in substantially the proportions stated for producing a non-hardening, non-adhesive paste or composition.

In testimony whereof I have signed this specification in the presence of two subscribing witnesses.

FRANK H. LEWIS.

Witnesses:
LILLIAN D. KELSEY,
GEORGE D. SEYMOUR.